July 23, 1940.  R. L. FLUELLEN  2,208,926
SLIP
Filed Nov. 25, 1938  2 Sheets-Sheet 1
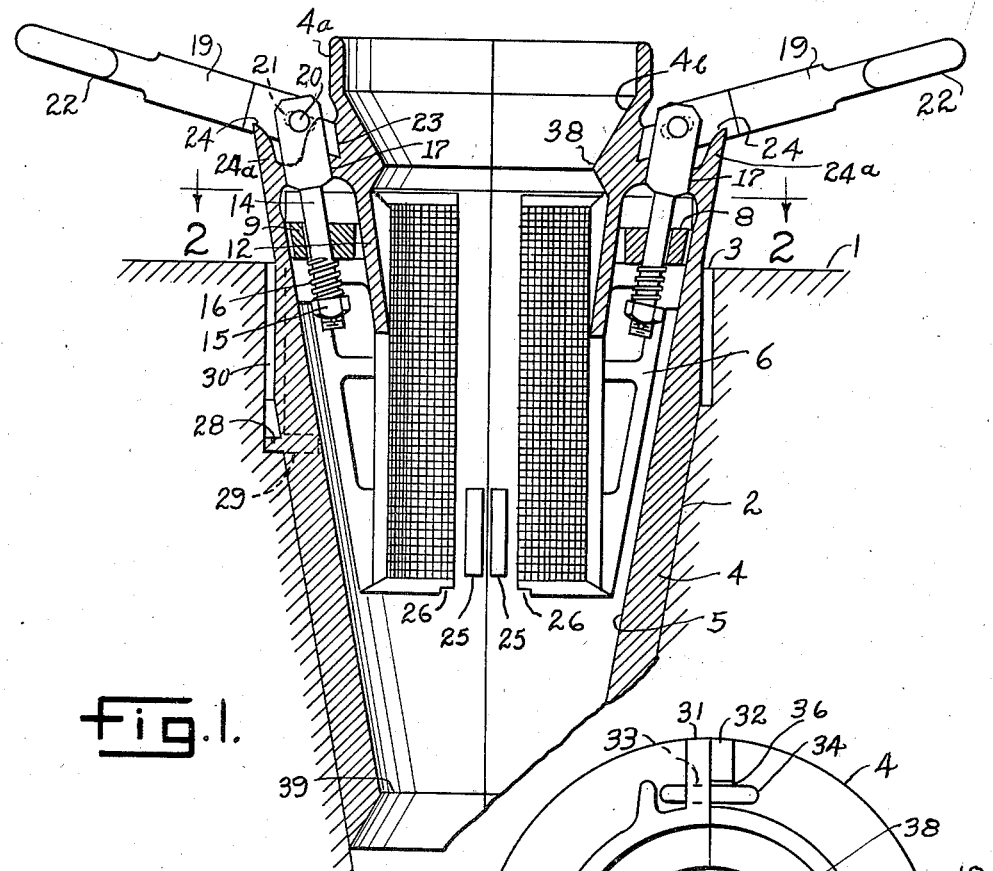
Fig. 1.
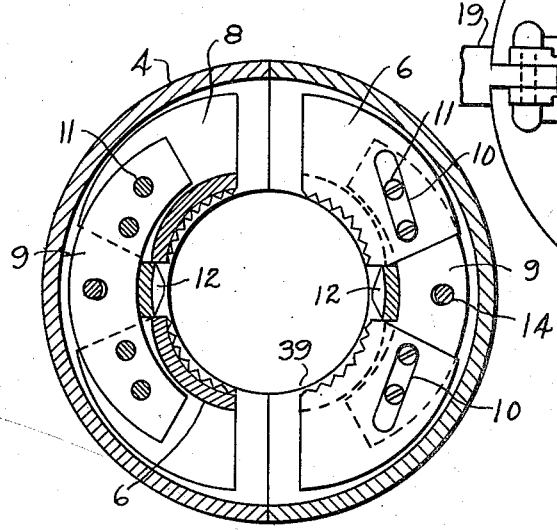
Fig. 2.
Fig. 3.
Inventor
ROBERT L. FLUELLEN
By
Edward V. Hardway
Attorney July 23, 1940.   R. L. FLUELLEN   2,208,926
SLIP
Filed Nov. 25, 1938   2 Sheets-Sheet 2

Inventor
ROBERT L. FLUELLEN
By Edward V. Hardway
Attorney

Patented July 23, 1940

2,208,926

UNITED STATES PATENT OFFICE 2,208,926

SLIP

Robert L. Fluellen, Houston, Tex.

Application November 25, 1938, Serial No. 242,142

6 Claims. (Cl. 24—263)

This invention relates to a slip.

The invention embodies certain improvements over that type of slip disclosed in my co-pending application filed January 28, 1937, under Serial No. 122,761.

An object of the invention is to provide a slip which is specially designed for use in handling pipe while lowering the same into, or withdrawing the same from, a well and which is at all times maintained in readiness for instant use.

Another object of the invention is to provide a vertically elongated slip cage adapted to seat in a drive bushing of a rotary table, or other seat, and of a length to extend above the table so that the slip segments may be actuated into upper or released position, and securely locked in said position and may be readily released to move by gravity into pipe engaging position.

The invention also embodies means whereby the downwardly movement of the slip segments in the cage will be limited to the end that the segments will be approximately opposite while in active, or pipe engaging position.

It is a further object of the invention to provide means to prevent the turning movement of the segments, in the cage when the pipe, held by the segments, is subjected to torsional strain, as well as means for causing the circumferential movement of the segments of each pair of the slip sections upon their upward movement so that the two pairs of slip segments, upon their upward movement, will be maintained in substantially opposite position in the cage.

With the above and other objects in view the invention has particular relation to certain novel features of construction, operation and arrangement of parts, an example of which is given in this specification and illustrated in the accompanying drawings, wherein:

Figure 1 shows a vertical, sectional view of the slip showing the slip segments in upper, or inactive, position.

Figure 2 shows a cross-sectional view taken on the line 2—2 of Figure 1.

Figure 3 shows a plan view.

Referring now more particularly to the drawings wherein like numerals of reference designate the same parts in each of the figures, the numeral 1 designates a suitable support such as a drive bushing of a rotary table of the well known rotary drilling machine. The drive bushing has a downwardly tapering seat 2 whose upper end is formed with a rectangular recess 3 which is preferably square in horizontal cross-section. There is a cage designated generally by the numeral 4 and whose lower end is downwardly tapered and thus adapted to fit into the seat 2. As shown this cage is formed of two sections although the number of the cage sections is optional.

Figure 5:
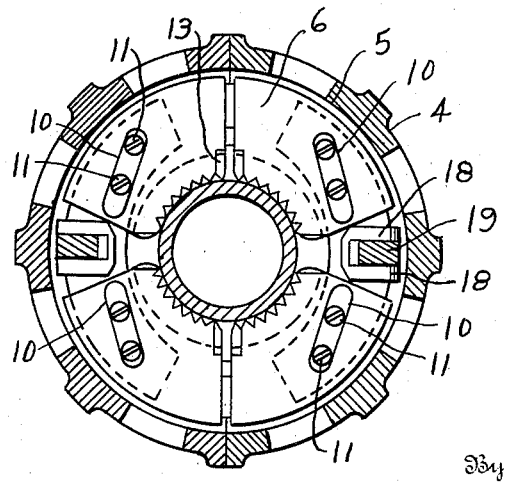
Figure 5 shows a transverse, sectional view taken on the line 5—5 of Figure 4.

The walls of the cage section which fit into the seat 2 are approximately parallel so that the inside of the cage also converges downwardly forming a seat 5 on which the slip segments 6 ride. These slip segments are wedge shaped and their outer sides taper downwardly and conform to the taper of the seat 5. They are arcuate in horizontal, cross-sectional contour, their inner sides being thus shaped to fit closely about the pipe 7 to be held. The inner sides of the slip segments are toothed so as to securely grip the pipe to be held. The slip segments are connected in pairs, or sections, as more clearly shown in Figures 2 and 5. As shown one pair, or section, of slip segments is mounted in each cage section as more clearly indicated in Figures 2, 5 and 6. Adjacent each upper end each segment is provided with a deep, external groove 8, the grooves of the respective segments of each pair being transversely aligned. Arcuate yokes 9, 9 are fitted into the grooves 8 of the respective sections or pairs of slip segments. The upper ends of the segments of the respective sections have the elongated slots 10, 10, the slots of each pair converging slightly outwardly as shown in Figures 2 and 5 and there are the respective pairs of pins 11, 11 for each slot anchored to the corresponding yokes beneath and extending upwardly through said slots. The pins projecting through the corresponding slots are spaced a distance apart somewhat less than the length of the corresponding slots and the slots of each pair diverge at such angles as to permit the slip segments to expand upon upward movement of the segments and to contract, or move inwardly upon downward movement of the segments.

The upper end 4a of the cage is reduced in diameter and its inner side is formed with a downwardly converging guide 4b to prevent the outside couplings of the pipe or casing 7 from hanging thereon. The upper end of each section of the cage has a downwardly pointed wedge shaped expander 12 arranged between the slip segments, of that section of the cage and upon upward movement of said segments these expanders will cooperate with the corresponding tapering faces 13, 13 at the upper outer corner of adjacent segments whereby the segments of each pair, or section, of the slip will be caused to move apart and the corresponding pins 11 moving outwardly along the corresponding slots 10 will effect a uniform expansion of the slip segment.

Lift rods 14, 14 work downwardly through suitable bearings in the yokes 9 between the corresponding segments connected by said yokes and on the lower ends of the lift rods are the stops 15, said stops being shown as nuts which may be threaded onto said rods. Coil springs 16 surround said rods and are interposed between the corresponding yokes and the stops beneath as clearly shown in Figures 1 and 6. The upper ends of the cage sections have the vertical bearings 17 in alignment with said rods. The upper ends of the rods 14 are bifurcated forming the spaced ears 18, 18 and fitted between said ears are the inner, or lower ends of the levers 19 which are pivoted between these ears by means of pins 20, which pass through elongated bearings 21 provided in said levers. The outer ends of the levers are formed with suitable grips 22.

Figure 6:
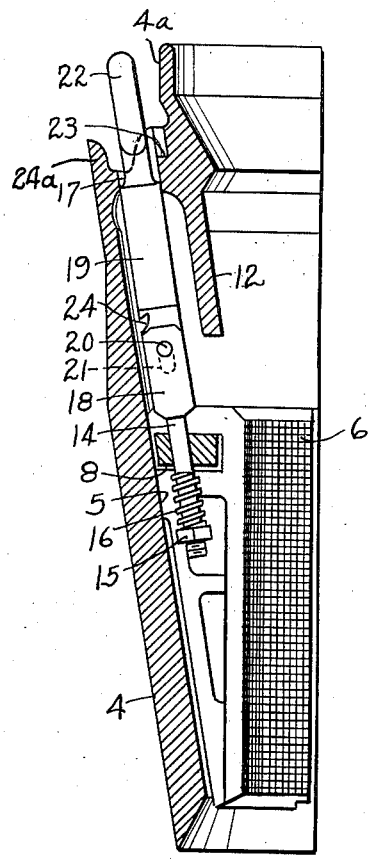
Figure 6 shows a vertical, sectional view taken at right angles to the view shown in Figure 4.
Figure 4:
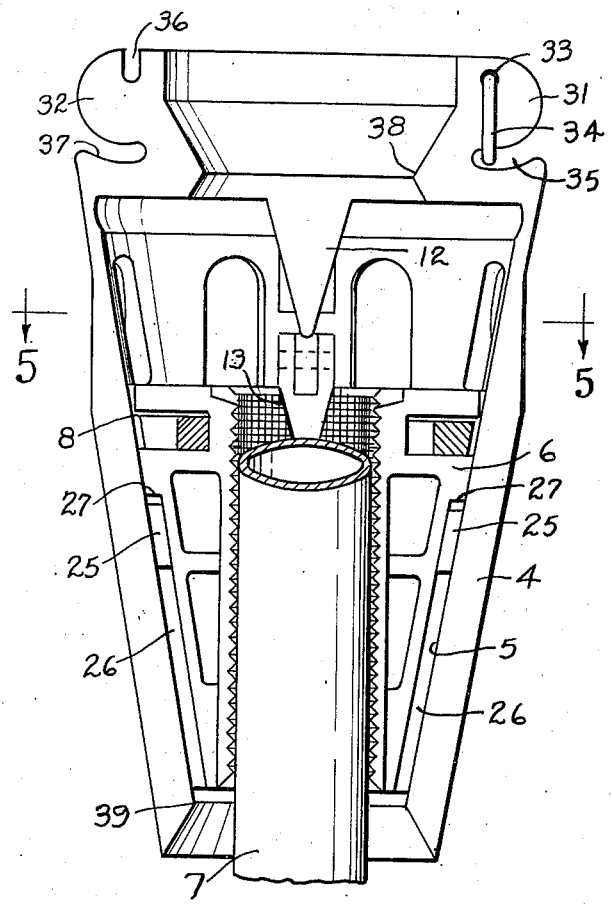
Figure 4 shows an inside, elevational view of a cage section showing the slip segments therein in active position.

When the slip segments are in active position, as shown in Figures 4 and 6 the levers 19 will be in alignment with the rods 14 and will be moved downwardly through the bearings 17 as the slip segments move down to active position by gravity. When the slip segments are in this active position they will securely grip the string of pipe 7 and hold it suspended in the well bore.

If it now be desired to release the slips from a string of pipe said string is first slightly elevated by well known appliances for that method so as to take the load of the string off of the segments and each pair of segments may then be elevated by the workman by an upward pull on the levers 19.

When the lower ends of the levers clear the bearings 17 said levers may be swung outwardly. The upper ends of the slip segments, however, will at this time be in abutting relation with the upper end of the corresponding cage section so that said segments cannot move further upwardly. As the levers are swung outwardly they will operate on the upper outer margins of the corresponding cage sections as fulcrums, as indicated in Figure 1, and the inwardly projecting ends of the levers will move on upwardly placing the springs 16 under compression and said inwardly projecting ends of said levers may, by an inward movement of the levers, be engaged in the notches 23 of the corresponding cage section. Each lever 19 has an external notch 24 adjacent its pivoted end which may, at the same time, be engaged over the upper lug 24a of the corresponding cage section, as shown in Figure 1 and the levers thus locked securely in place with the corresponding slip sections held elevated.

In thus elevating the slip segments the springs 16 will be placed under compression, as shown in Figure 1, so as to hold the levers 19 securely locked in said position to prevent accidental displacement thereof and consequent dropping of the slip segments.

When it is desired to again grip and hold the pipe preparatory to adding another section thereto, or breaking out a section therefrom, the outer ends of the levers 19 should be simultaneously pulled outwardly to disengage their inner ends from the notches 23 and should then be swung upwardly and inwardly into alignment with the rods 14 and said slip segments will then simultaneously drop by gravity into their lower, or active, position, as shown in Figures 4 and 6.

In making up a string of pipe, or while breaking the same out, it is desirable that the string suspended in the bore be held against turning. For that purpose each cage section is provided with inside, longitudinally extended, tenons 25 formed thereon adjacent each margin and the outer margins of the segments of each slip section is undercut forming longitudinal, marginal mortises 26 terminating at their upper ends in the abrupt, external shoulders 27, as shown more clearly in Figures 1 and 4, said mortises being provided to receive the tenons, when the slip segments are in their lower position whereby said segments will be held against turning in the cage and the pipe suspended by said segments will also be held against turning. The friction of the cage with the seat 2 of the drive bushing will usually be sufficient to hold said cage against turning but if desired the cage may have an external knob 28 formed thereon to fit into the laterally turned lower end 29 of the J-slot 30, as shown in Figure 1, whereby the cage will also be held against turning and will be held against upward movement in the seat 2 when the pipe 7 is elevated preparatory to releasing the slip segments therefrom.

In lowering the slip sections if they are simultaneously lowered in such manner that they remain in transverse alignment they will engage and grip the pipe and wedge between it and the cage before the shoulders 27 engage the upper ends of the tenons 25, as shown in Figure 4, so that when the full weight of the suspended string is assumed by the slip segments they may move slightly further downwardly so as to cause them to also move inwardly to more securely grip the pipe 7. If, in lowering the slip sections, one should be lowered in advance of the other its shoulders 27 will engage the tenons 25 below to stop the downward movement of said section with its shoulders 27 hanging on the corresponding tenons 25 and when the other section is lowered it will wedge against the pipe before its shoulders 27 have reached the upper ends of the corresponding tenons 25 to the end that when the full weight of the string is assumed by the slip segments this last mentioned slip section may move further downwardly and will consequently move further inwardly to more securely grip the pipe to be held. In either of said events the slip sections will be exactly, or at least approximately, in transverse alignment when they are in active, or pipe gripping position. This will prevent the pipe from becoming distorted or kinked as would be the case if one slip section were a considerable distance elevated above the other section when the pipe is gripped and held thereby.

Provision has been made for fastening the sections of the cage together. At the upper end of each cage each section is provided with the outwardly extending ears 31, 32. Each ear 31 is provided with an opening 33 to receive a link 34 and beneath said ear there is a slot 35 to receive said link. When the cage sections are assembled the ear 31 of one section coincides with the ear 32 of the other section and each ear 32 is provided with a notch 36 in its upper side and a slot 37 beneath it to receive the corresponding link 34 whereby the sections may be secured together as shown more clearly in Figures 3 and 4.

While a string of pipe is being made up and let down into the well or is broken up and withdrawn the slip segments are maintained at all times in position for use without the necessity of entirely removing them from time to time while the pipe is being manipulated in carrying out the above mentioned operations, as is now the case with slips commonly used, but the only manipulation of the slip segments necessary while making up or breaking out the string is the elevation, and the release, of the slip segments in the cage as herein-above fully explained thus relieving the workmen of a major portion of their labor incident to handling slips.

In order to protect the inside gripping teeth of the segments against undue wear from contact with the pipe while the segments are in their upper, or inactive position, and while the pipe is being elevated or lowered, the cage is provided with upper and lower inwardly contracted portions, or ribs as 38, 39 of approximately the same diameter. When the slip segments are in their upper position, as shown in Figures 1, 2 and 3 they will have moved outwardly so that their toothed inner surfaces will be out beyond the cylindrical surface defined by the apexes of said ribs 38, 39 and these ribs will act to hold the pipe, being elevated or lowered through the slips, from coming into frictional contact with said teeth thus protecting the teeth from unnecessary wear and thereby becoming dulled.

It is to be further noted that the lifting mechanism for the slip sections hereinabove described is located immediately behind the expanders 12 to the end that said elevating mechanism will also be shielded and protected by said expanders while the slip is in use or after it has been removed. To completely remove the slips from the rotary table, or other supporting seat, the links 34 may be swung outwardly to disconnect the cage sections and said sections may then be lifted out and laid aside until the use of the slip is again required.

What I claim is:

1. In a pipe holding slip a cage section having an upper lug and an inner notch, at its upper end, a slip segment in the cage section, a lift rod, a coil spring on the rod engageable with the segment whereby the rod is yieldingly connected to the slip segment, a lift lever having a slidable, pivoted connection with the rod, said cage section having a vertical bearing through which the rod works, said lever having an external notch and the rod and lever being movable upwardly to elevate said slip segment and the lever being swingable outwardly to engage its inner end in the notch of the cage section and to engage the lug in the notch of the lever to lock the slip segment in elevated position.

2. In a pipe holding slip a cage section having an upper lug and an inner notch, at its upper end, a slip segment in the cage section, a lift rod, yieldable means between the rod and segment whereby the rod is yieldingly connected to the slip segment, a lift lever having a slidable, pivoted connection with the rod, said cage section having a vertical bearing through which the rod works, said lever having an external notch and the rod and lever being movable upwardly to elevate said slip segment and the lever being swingable outwardly to engage its inner end in the notch of the cage section and to engage the lug in the notch of the lever to lock the slip segment in elevated position and an inside downwardly pointed shield on the cage section spaced radially inwardly from, and forming a shield for, said lift rod.

3. In a slip, a cage section having an inside tapering seat and having an upper lug and an inside notch at its upper end, a slip section on said seat and composed of segments loosely connected together, a lift rod, a yieldable means on the rod engageable with a slip segment whereby the rod is yieldably connected to the slip section, a lift lever connected to the rod and having an outside notch, said cage section having a vertical bearing in which the rod works, said lever and rod being movable upwardly to elevate the slip section and the lever, when elevated, being movable outwardly to seat the inner end of the lever in the cage notch and to seat the lug in the lever notch, a wedge shaped expander on the cage section effective to move the segments apart as the slip section is elevated, said expander being located radially inwardly of, and forming a shield for, the lift rod.

4. In a slip, a cage section having an outside upper lug and an inside seat, at its upper end and having a vertical bearing between the lug and seat, a slip section in the cage section formed of segments loosely connected together, lifting means working through said bearing and yieldingly connected to the slip section and comprising a lift rod and a lift lever pivoted to the rod and having a notch, said lifting means being movable upwardly to elevate the slip section and the lever being movable outwardly, when in its upper position to seat its inner end on said seat and to engage said lug in said notch.

5. A pipe holding slip comprising a cage formed of sections and having an inside downwardly tapering seat and oppositely disposed catches, slip sections on the seat, each section being composed of wedge shaped slip segments loosely connected together, the upper end of the cage having seats and vertical bearings opposite the respective catches and having lifting means working through said bearings and connected to the respective sections, each lifting means comprising a lift rod and a lift lever slidably and pivotally connected to the rod and forming means for elevating the slip sections on the seat, said levers having external notches and being movable outwardly, when in elevated position, to engage the inner ends of the levers on the corresponding upper end seats of the cage and to engage the catches in notches of the corresponding levers.

6. A pipe holding slip comprising a cage formed of sections and having an inside downwardly tapering seat and oppositely disposed catches at its upper end, slip sections on the seat, each section of the slip being composed of separate wedge shaped segments, means for connecting the segments of each section loosely together, the upper end of the cage having seats radially inwardly from the respective catches and having approximately vertical bearings between the respective catches and their corresponding seats, lifting means working through said bearings and connected to the respective sections, each lifting means comprising a lift rod and a lift lever slidably and pivotally connected to the rod and forming means for elevating the slip sections on the cage seat, a yieldable member forming the connection between each rod and its respective section, said levers having external notches and being movable outwardly when in elevated position to engage the inner ends of the levers on the corresponding upper end seats of the cage and to engage the catches in said notches of the corresponding lever.

ROBERT L. FLUELLEN.